United States Patent
Nishii

(10) Patent No.: US 9,729,753 B2
(45) Date of Patent: Aug. 8, 2017

(54) OPERATION INPUT SYSTEM, ELECTRONIC DEVICE AND MOBILE TERMINAL

(71) Applicant: SHARP KABUSHIKI KAISHA, Osaka-shi, Osaka (JP)

(72) Inventor: Yasuto Nishii, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 51 days.

(21) Appl. No.: 14/540,758

(22) Filed: Nov. 13, 2014

(65) Prior Publication Data
US 2015/0181050 A1 Jun. 25, 2015

(30) Foreign Application Priority Data
Dec. 25, 2013 (JP) ................................ 2013-266463

(51) Int. Cl.
H04N 1/387 (2006.01)
H04N 1/00 (2006.01)

(52) U.S. Cl.
CPC ......... *H04N 1/387* (2013.01); *H04N 1/00307* (2013.01); *H04N 2201/006* (2013.01); *H04N 2201/0041* (2013.01); *H04N 2201/0075* (2013.01); *H04N 2201/0094* (2013.01); *H04N 2201/0096* (2013.01)

(58) Field of Classification Search
CPC ...... H04N 2201/006; H04N 2201/0075; G06F 3/0488
USPC ...... 358/1.15, 1.13; 455/41.1; 345/179, 173; 715/230, 268, 233
See application file for complete search history.

(56) References Cited

U.S. PATENT DOCUMENTS

| | | | |
|---|---|---|---|
| 2004/0150627 A1* | 8/2004 | Luman et al. | 345/173 |
| 2010/0069008 A1 | 3/2010 | Oshima et al. | |
| 2010/0309515 A1* | 12/2010 | Odagawa | G06F 3/1208 358/1.15 |
| 2011/0292445 A1* | 12/2011 | Kato | 358/1.15 |
| 2014/0085654 A1* | 3/2014 | Miyazaki | 358/1.13 |
| 2014/0268203 A1* | 9/2014 | Saotome | H04N 1/00408 358/1.13 |

FOREIGN PATENT DOCUMENTS

| | | |
|---|---|---|
| JP | 63-4742 A | 1/1988 |
| JP | 2012-89161 A | 5/2012 |
| JP | 2013-131062 A | 7/2013 |

* cited by examiner

*Primary Examiner* — Jacky X Zheng
(74) *Attorney, Agent, or Firm* — Birch, Stewart, Kolasch & Birch, LLP

(57) ABSTRACT

Electronic device is linked with a mobile terminal, screen transition of the electronic device is eliminated, and various operation input is performed while confirming operation content from the mobile terminal on a screen of the electronic device. When proximity of the mobile terminal is detected in a state of displaying a specific screen on an operation display portion, an image forming apparatus transmits operation input information associated with the specific screen in advance to the mobile terminal. The mobile terminal displays an operation input screen based on the operation input information transmitted from the image forming apparatus and transmits operation content instructed by a user from the operation input screen to the image forming apparatus. The image forming apparatus updates the specific screen in accordance with the operation content transmitted from the mobile terminal.

8 Claims, 16 Drawing Sheets

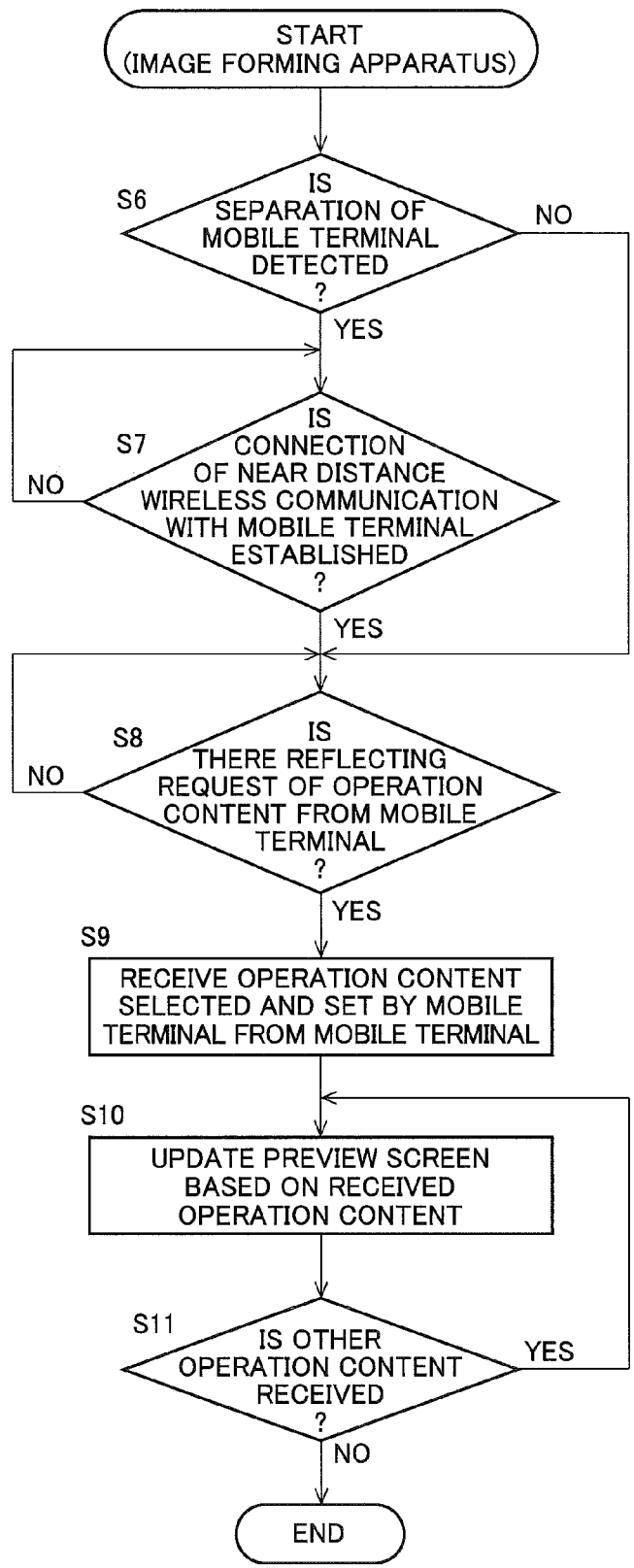

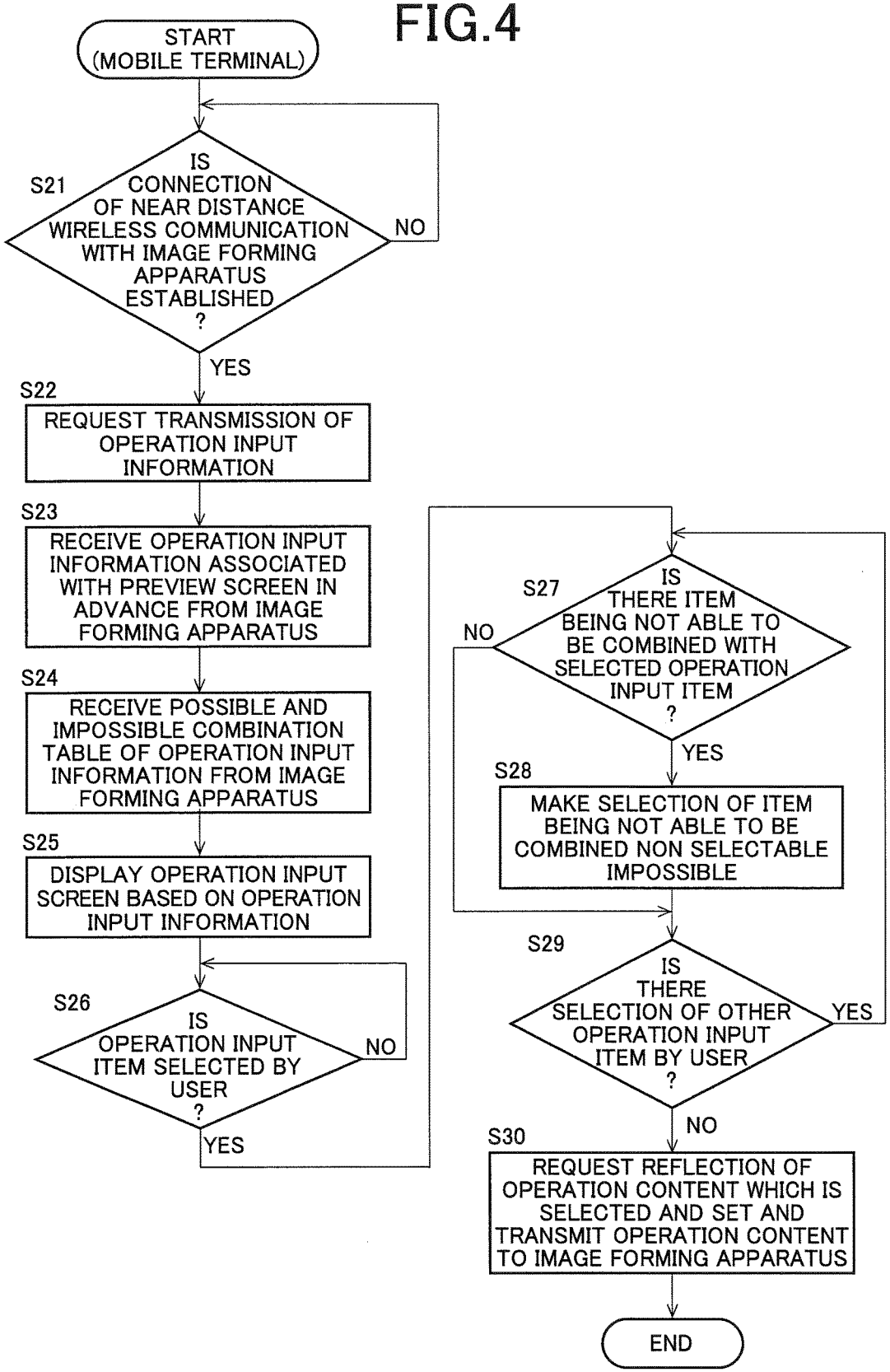

| | PAGE AGGREGATION | BOOK PRINTING | BLANK SHEET SKIP | BACKGROUND PATTERN SETTING | ⋮ | ⋮ | ⋮ |
|---|---|---|---|---|---|---|---|
| PAGE AGGREGATION | − | 0 | 1 | 1 | · | · | · |
| BOOK PRINTING | 0 | − | 0 | 1 | · | · | · |
| BLANK SHEET SKIP | 1 | 0 | − | 1 | · | · | · |
| BACKGROUND PATTERN SETTING | 1 | 1 | 1 | − | · | · | · |
| ... | · | · | · | · | − | · | · |
| ... | · | · | · | · | · | − | · |
| ... | · | · | · | · | · | · | − |

OPERATION INPUT SYSTEM, ELECTRONIC DEVICE AND MOBILE TERMINAL

This non-provisional application claims priority under 35 U.S.C. §119(a) on Patent Application No. 2013-266463 filed in JAPAN on Dec. 25, 2013, the entire contents of which are hereby incorporated herein by reference.

FIELD OF THE INVENTION

The present invention relates to an operation input system, electronic device, a mobile terminal and an operation input method, and, more specifically, relates to an operation input system which links electronic device such as an image forming apparatus with a mobile terminal to enable operation input using the mobile terminal, electronic device, a mobile terminal and an operation input method.

BACKGROUND OF THE INVENTION

An MFP (Multi-Function Peripheral: digital multi-function peripheral), which is one of image forming apparatuses, is provided with a plurality of functions such as a printer function, a copying function, a facsimile function and a scanner function. Such an image forming apparatus commonly has a liquid crystal display provided with a touch panel function and receives operation input from a user. Moreover, some of these image forming apparatuses are provided with a preview display function for displaying a print image (print preview image) on a screen of the liquid crystal display before printing image data. By using this preview display function, the user is able to confirm a printed matter of the image data on the screen before actually performing print output, and, in addition, is able to perform editing and the like on the screen in a case where the print image on the screen is different from desired one.

FIG. 13A through FIG. 13E are diagrams explaining a preview display function in a conventional image forming apparatus. In the diagrams, 100, 101, 102, 103 and 104 denote a preview screen, an edit button, a screen of various edit menus, an OK button and a footer, respectively. When a user performs a predetermined operation for the image forming apparatus, the image forming apparatus causes a touch panel screen thereof to display the preview screen 100. Then, a print preview image of image data is displayed on this preview screen 100.

First, the user sees the preview screen 100 to select a page to be edited (FIG. 13A, S101). Here, "Page 1" is selected by a touch operation of the user. Next, when the user presses (touches) the edit button 101 displayed on the preview screen 100 (FIG. 13B, S102), the image forming apparatus switches the touch panel screen and displays the screen of various edit menus 102 on the touch panel screen (FIG. 13C, S103). In this screen of various edit menus 102, edit items, for example, such as double-side setting, page aggregation, punch setting, header setting, blank sheet skip, book printing, footer setting, background pattern setting, and staple are displayed so as to be selectable by the user.

Then, when the user selects a desired edit item from the screen of various edit menus 102 at S103 above and further presses the OK button 103, edited content of the this edit item is reflected in the print preview image (FIG. 13D, S104). Here, the "footer setting" is selected by the touch operation of the user, and a date is able to be inserted in a footer.

Then, the image forming apparatus switches the touch panel screen to display the preview screen 100 on the touch panel screen again, but the edited content at S104 above is reflected in the preview screen 100. That is, in the case of this example, the date is inserted in the footer 104 of the "Page 1" in the preview screen 100 (FIG. 13E, S105). Note that, in a case where editing is performed also for other "Page 2", "Page 3", . . . , processing from S101 is performed repeatedly.

On the other hand, an electronic blackboard which enables handwriting input by a finger of a user or a stylus by using a large-sized liquid crystal display and a touch panel has been put into practical use.

FIG. 14A through FIG. 14D are diagrams explaining a handwriting input function in a conventional electronic blackboard. In the diagrams, 110, 111, 112 and 113 denote a handwriting input screen, various setting change buttons, a various setting change screen and a handwriting input image, respectively. When a user performs a predetermined operation for the electronic blackboard, the electronic blackboard causes the handwriting input screen 110 to display the various setting change button 111. Note that, this handwriting input screen 110 allows a touch operation, and is able to recognize a coordinate and a trace input by a finger of the user or a stylus to display as a handwriting input image.

First, when the user presses (touches) the various setting change button 111 displayed on the handwriting input screen 110 (FIG. 14A, S111), the electronic blackboard displays the various setting change screen 112 on the handwriting input screen 110 (FIG. 14B, S112). In this various setting change screen 112, for example, "stylus type", "stylus size", "stylus color" and the like are displayed so as to be selectable by the user. With the "stylus type", a shape of a stylus tip is able to be set as a round shape, a square shape, a triangular shape or the like. With the "stylus size", a size of the stylus is able to be set as thick, normal, thin or the like. With the "stylus color", a color of the stylus is able to be set as black, red, green or the like.

Then, when the user selects desired setting from the various setting change screen 112 at S112 above and thereafter presses the various setting change button 111 to close the various setting change screen 112 (FIG. 14C, S113), the electronic blackboard reflects the setting selected by the user at S112 in the handwriting input image 113 by the finger of the user or the stylus (FIG. 14D, S114). For example, in a case where setting of the stylus is set as "round shape, thick, red color", the handwriting input image 113 input by the user to the handwriting input screen 110 by the finger or the stylus is displayed so as to be "round shape, thick, red color".

However, for the operation input explained in FIG. 13A through FIG. 13E and FIG. 14A through FIG. 14D above, screen transition occurs a plurality of times, and there is a problem that user convenience is poor. Moreover, each time the number of functions increases, hierarchy becomes deeper, and the number of times of operations increases until the user reaches a required function, so that there is a problem that a burden on the user is large, as well.

Against this, technologies by which electronic device such as an image forming apparatus or an electronic blackboard is linked with a mobile terminal such as a smart phone to improve user convenience are variously proposed. For example, in Japanese Laid-Open Patent Publication No. 2012-89161, a system composed of an image forming apparatus, a server and a mobile terminal is described. According to this, when the mobile terminal is held over the server, the server performs user authentication, and generates menu information corresponding to an execution state of the image forming apparatus to transmit to the mobile terminal. The mobile terminal performs selection of a desired service and a set value from among the menu information acquired from the server, and is held over the server again. The server acquires selection response information from the mobile terminal, and controls the image forming apparatus so as to execute the service designated by this information.

However, by the invention described in Japanese Laid-Open Patent Publication No. 2012-89161 above, the image forming apparatus is able to be controlled corresponding to operation input from the mobile terminal, but, due to necessity of being through the server, a user is not able to know how content input from the mobile terminal is being reflected in the image forming apparatus.

SUMMARY OF THE INVENTION

The present invention has been made in view of circumstances as described above, and aims to provide an operation input system which links electronic device such as an image forming apparatus with a mobile terminal and eliminates screen transition of the electronic device so that a user is able to perform various operation input while confirming operation content from the mobile terminal on a screen of the electronic device, electronic device, a mobile terminal and an operation input method.

An object of the present invention is to provide an operation input system, comprising an electronic device having a display portion and a mobile terminal capable of near distance wireless communication with the electronic device, wherein the electronic device is provided with a transmitting portion which, when proximity of the mobile terminal is detected in a state of displaying a specific screen on the display portion, transmits operation input information associated with the specific screen in advance to the mobile terminal, the mobile terminal is provided with a display portion which displays an operation input screen based on the operation input information transmitted from the electronic device, and a transmitting portion which transmits operation content instructed by a user from the operation input screen to the electronic device, and the electronic device is provided with an updating portion which updates the specific screen in accordance with the operation content transmitted from the mobile terminal.

Another object of the present invention is to provide the operation input system, wherein when connection of the near distance wireless communication with the mobile terminal is established, the electronic device establishes connection of other wireless communication capable of longer-distance wireless communication than the near distance wireless communication with the mobile terminal.

Another object of the present invention is to provide the operation input system, wherein as the operation input information, the transmitting portion of the electronic device transmits ID information of an operation input item associated with the specific screen in advance to the mobile terminal, the mobile terminal is provided with a storage portion in which operation input screen information associated with the ID information of the operation input item is stored, and the display portion of the mobile terminal displays the operation input screen in accordance with the operation input screen information stored in the storage portion.

Another object of the present invention is to provide the operation input system, wherein as the operation input information, the transmitting portion of the electronic device transmits operation input screen information including ID information of an operation input item associated with the specific screen in advance to the mobile terminal, and the display portion of the mobile terminal displays the operation input screen in accordance with the operation input screen information.

Another object of the present invention is to provide the operation input system, wherein the operation input item is set by the user in advance.

Another object of the present invention is to provide the operation input system, wherein in a case where the electronic device is an image forming apparatus, the specific screen is a preview screen, and the operation input item is an item concerning editing of a print preview image displayed on the preview screen.

Another object of the present invention is to provide the operation input system, wherein in a case where the electronic device is an electronic blackboard, the specific screen is a handwriting input screen, and the operation input item is an item concerning editing of a handwriting input image displayed on the handwriting input screen.

Another object of the present invention is to provide an electronic device having a display portion and capable of near distance wireless communication with a mobile terminal, wherein the electronic device is provided with a transmitting portion which, when proximity of the mobile terminal is detected in a state of displaying a specific screen on the display portion, transmits operation input information associated with the specific screen in advance to the mobile terminal, a receiving portion which receives operation content instructed by a user for the operation input information from the mobile terminal, and an updating portion which updates the specific screen in accordance with the operation content received by the receiving portion.

Another object of the present invention is to provide a mobile terminal capable of near distance wireless communication with an electronic device having a display portion, wherein the mobile terminal is provided with a receiving portion which, when coming close to the electronic device in a state of having a specific screen displayed on the display portion, receives ID information of an operation input item associated with the specific screen in advance from the electronic device, a storage portion which stores operation input screen information associated with the ID information of the operation input item, a display portion which displays an operation input screen in accordance with the operation input screen information stored by the storage portion, and a transmitting portion which transmits operation content instructed by a user from the operation input screen to the electronic device, and causes the specific screen of the electronic device to be updated in accordance with the operation content transmitted by the transmitting portion.

BRIEF DESCRIPTION OF THE DRAWINGS

FIG. 3A and FIG. 3B are flowcharts explaining exemplary processing of an image forming apparatus shown in FIG. 2;

FIG. 4 is a flowchart explaining exemplary processing of a mobile terminal shown in FIG. 2;

PREFERRED EMBODIMENTS OF THE INVENTION

Description will hereinafter be given for preferred embodiments according to an operation input system, electronic device, a mobile terminal and an operation input method of the present invention with reference to accompanying drawings.

Figure 1:
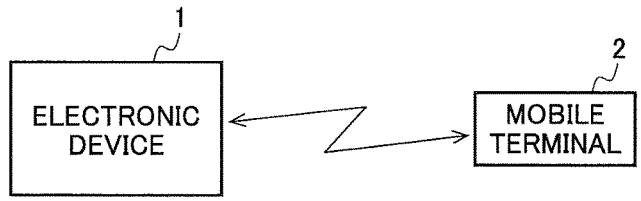
FIG. 1 is a diagram showing an exemplary configuration of an operation input system according to the present invention.

FIG. 1 is a diagram showing an exemplary configuration of an operation input system according to the present invention, and 1 denotes electronic device and 2 denotes a mobile terminal in the diagram. The electronic device 1 has a display portion such as a liquid crystal display and is able to be exemplified, for example, as an image forming apparatus and an electronic blackboard explained in FIG. 13A through FIG. 13E and FIG. 14A through FIG. 14D above, and the like. In addition, the mobile terminal 2 may be a tablet terminal, for example, including a smart phone and a mobile phone. The electronic device 1 and the mobile terminal 2 are able to be connected with each other by near distance wireless communication (also referred to as short distance wireless communication), for example, such as NFC (Near Field Communication).

First Embodiment

Figure 2:
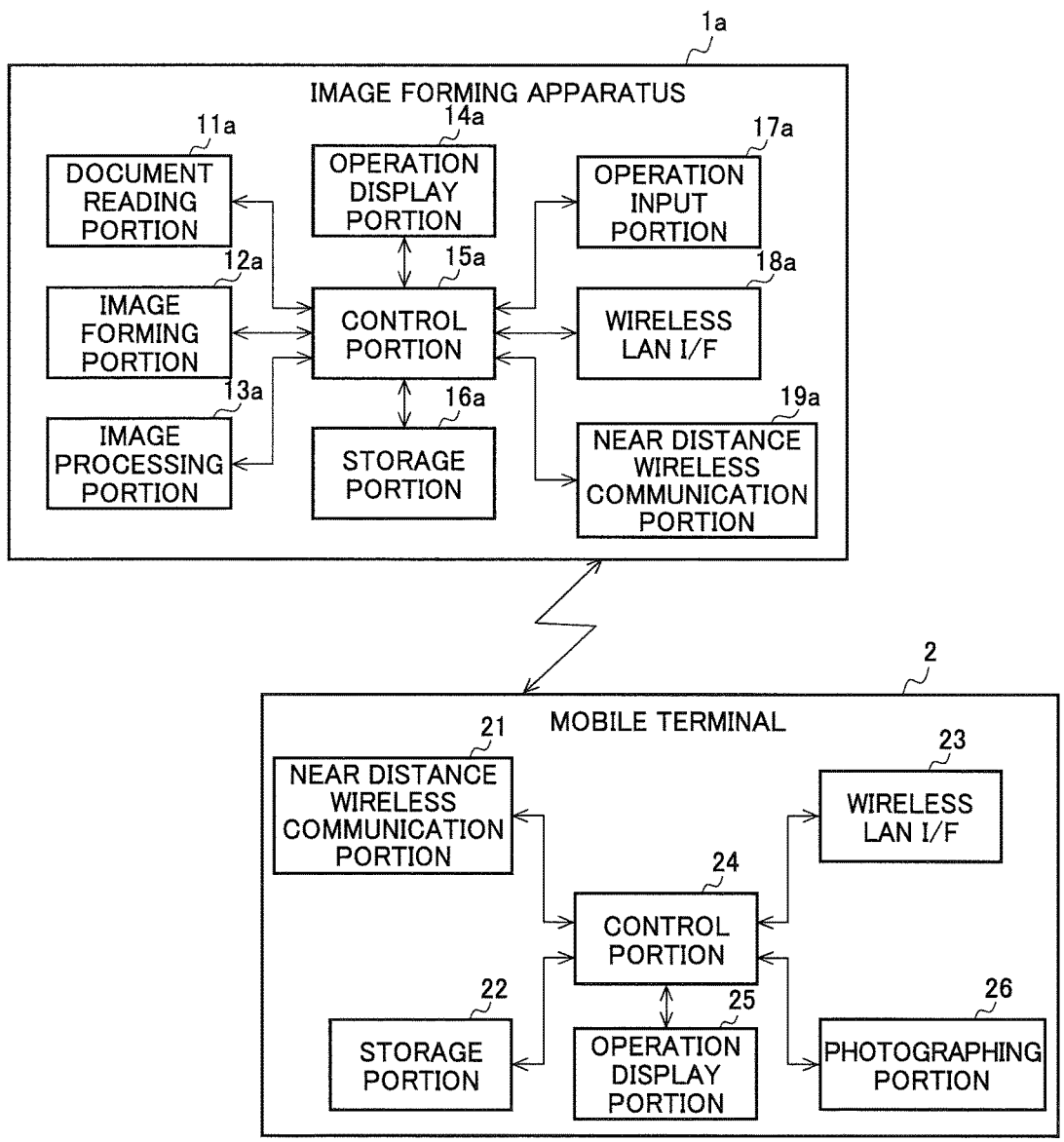
FIG. 2 is a block diagram showing an exemplary configuration of an operation input system according to a first embodiment of the present invention.

FIG. 2 is a block diagram showing an exemplary configuration of an operation input system according to a first embodiment of the present invention. The system of this example is composed of an image forming apparatus 1a which is one example of the electronic device 1 and the mobile terminal 2 capable of near distance wireless communication with the image forming apparatus 1a. The image forming apparatus 1a is able to be exemplified as an MFP (digital multi-function peripheral) having a plurality of functions such as a printer function, a copying function, a facsimile function and a scanner function, but may be a printer or a copier having a single function.

The image forming apparatus 1a is provided with a document reading portion 11a which optically reads a document image to input image data, an image forming portion 12a which forms an image based on the image data, an image processing portion 13a which applies various image processing to the image data, an operation display portion 14a which has a touch panel, a control portion 15a composed of a CPU controlling operations of the image forming apparatus 1a, a memory and the like, a storage portion 16a such as a hard disk or a semiconductor memory, an operation input portion 17a which includes a numeric key pad and various operation keys, a wireless LAN (Local Area Network)-I/F (interface) 18a which performs wireless LAN communication such as WiFi with the mobile terminal 2, and a near distance wireless communication portion 19a which performs near distance wireless communication such as NFC with the mobile terminal 2.

The mobile terminal 2 is provided with a near distance wireless communication portion 21 which performs near distance wireless communication such as NFC with the image forming apparatus 1a, a storage portion 22 such as a semiconductor memory, a wireless LAN-I/F 23 which performs wireless LAN communication such as WiFi with the image forming apparatus 1a, a control portion 24 composed of a CPU controlling operations of the mobile terminal 2, a memory and the like, an operation display portion 25 which has a touch panel, and a photographing portion 26 composed of an imaging element such as a CCD (Charge Coupled Device).

In the present embodiment, the image forming apparatus is linked with the mobile terminal and screen transition of the image forming apparatus is eliminated so that a user is able to perform various operation input while confirming operation content from the mobile terminal on a screen of the image forming apparatus. For such a configuration, the image forming apparatus 1a is provided with a transmitting portion which, when proximity of the mobile terminal 2 is detected in a state of displaying a specific screen on the operation display portion 14a (corresponding to a display portion of the electronic device of the present invention), transmits operation input information associated with the specific screen in advance to the mobile terminal 2. This transmitting portion corresponds to a transmitting portion of the electronic device of the present invention and is realized by the control portion 15a and the near distance wireless communication portion 19a of the image forming apparatus 1a. More specifically, when the user holds the mobile terminal 2 over the operation display portion 14a of the image forming apparatus 1a, the near distance wireless communication portion 19a of the image forming apparatus 1a detects proximity of the mobile terminal 2, and the near distance wireless communication portion 19a of the image forming apparatus 1a and the near distance wireless communication portion 21 of the mobile terminal 2 have a communication protocol, for example, based on NFC established therebetween to be connected so as to allow communication with each other.

Moreover, examples of the specific screen displayed on the operation display portion 14a of the image forming apparatus 1a include preview screens shown in FIG. 13A through FIG. 13E above. Further, the operation input information transmitted from the image forming apparatus 1a to the mobile terminal 2 is ID information of an operation input item associated with a preview screen in advance or operation input screen information including the ID information of the operation input item associated with the preview screen in advance. As the operation input item, edit items such as double-side setting, page aggregation, punch setting, header setting, blank sheet skip, book printing, footer setting, background pattern setting and staple may be set as they are as shown in FIG. 13A through FIG. 13E, or only the edit item which is frequently used by the user among these edit items may be set selectively. Specifically, for example, only double-side setting, header setting and footer setting are associated with the preview screen in advance. In addition, the ID information of the operation input items is information for discriminating these operation input items and notifying operation content according to the operation input items (such as operation code information). The image forming apparatus 1a is controlled so as to execute the operation content notified with this ID information. Moreover, the operation input screen information in this example is screen data for displaying the above-described operation input items on the screen.

The mobile terminal 2 is provided with a receiving portion which receives, when coming close to the image forming apparatus 1a in a state of having a preview screen displayed on the operation display portion 14a, operation input information associated with a preview screen in advance from the image forming apparatus 1a, a display portion which displays an operation input screen based on the received operation input information, and a transmitting portion which transmits operation content (that is, ID information) instructed by the user from the operation input screen to the image forming apparatus 1a. Note that, this display portion corresponds to a display portion of the mobile terminal of the present invention and is realized by the operation display portion 25 of the mobile terminal 2. Moreover, the receiving portion and the transmitting portion correspond to a receiving portion and a transmitting portion of the mobile terminal of the present invention, and are realized by the control portion 24 and the near distance wireless communication portion 21 of the mobile terminal 2. Here, as a method for displaying the operation input screen on the operation display portion 25 of the mobile terminal 2, two different methods are considered according to content of the operation input information transmitted from the image forming apparatus 1a.

First, as a first method, description will be given for a case where the operation input information is ID information of an operation input item. In this case, the mobile terminal 2 is provided with a storage portion in which operation input screen information associated with the ID information of the operation input item is stored, and the operation display portion 25 displays an operation input screen in accordance with the operation input screen information stored by this storage portion. Note that, this storage portion corresponds to a storage portion of the mobile terminal of the present invention and is realized by the storage portion 22 of the mobile terminal 2. That is, according to the first method, the image forming apparatus 1a transmits the ID information of the operation input item associated with the preview screen in advance to the mobile terminal 2. The operation input screen information is stored in the storage portion 22 of the mobile terminal 2 in association with the ID information of the operation input item, and the operation display portion 25 displays an operation input screen as shown in FIG. 5B described below in accordance with the operation input screen information stored in the storage portion 22.

Further, as a second method, description will be given for a case where operation input information is operation input screen information including ID information of an operation input item. In this case, the operation display portion 25 of the mobile terminal 2 displays an operation input screen in accordance with the operation input screen information received from the image forming apparatus 1a. That is, according to the second method, the operation input screen information including the ID information of the operation input item associated with the preview screen in advance is stored in the storage portion 16a of the image forming apparatus 1a, and this operation input screen information is transmitted to the mobile terminal 2. Then, the operation display portion 25 of the mobile terminal 2 displays the operation input screen in accordance with the operation input screen information from the image forming apparatus 1a. Note that, when a screen resolution of the mobile terminal 2 is not known in the image forming apparatus 1a side, the image forming apparatus 1a may obtain the screen resolution of the mobile terminal 2 when being connected to the mobile terminal 2 through near distance wireless communication so as to be able to convert the operation input screen information as appropriate according to this screen resolution.

Furthermore, the image forming apparatus 1a is provided with a receiving portion which receives the operation content (ID information) instructed by the user from the mobile terminal 2 and an updating portion which updates the preview screen in accordance with the received operation content. Note that, this receiving portion corresponds to a receiving portion of the electronic device of the present invention and is realized by the control portion 15a and the near distance wireless communication portion 19a of the image forming apparatus 1a. Moreover, the updating portion corresponds to an updating portion of the electronic device of the present invention and is realized as one function of the control portion 15a of the image forming apparatus 1a. Description will be given below for a specific example of the operation input method according to the operation input system above based on FIG. 3A and FIG. 3B to FIG. 6.

Figure 3A:
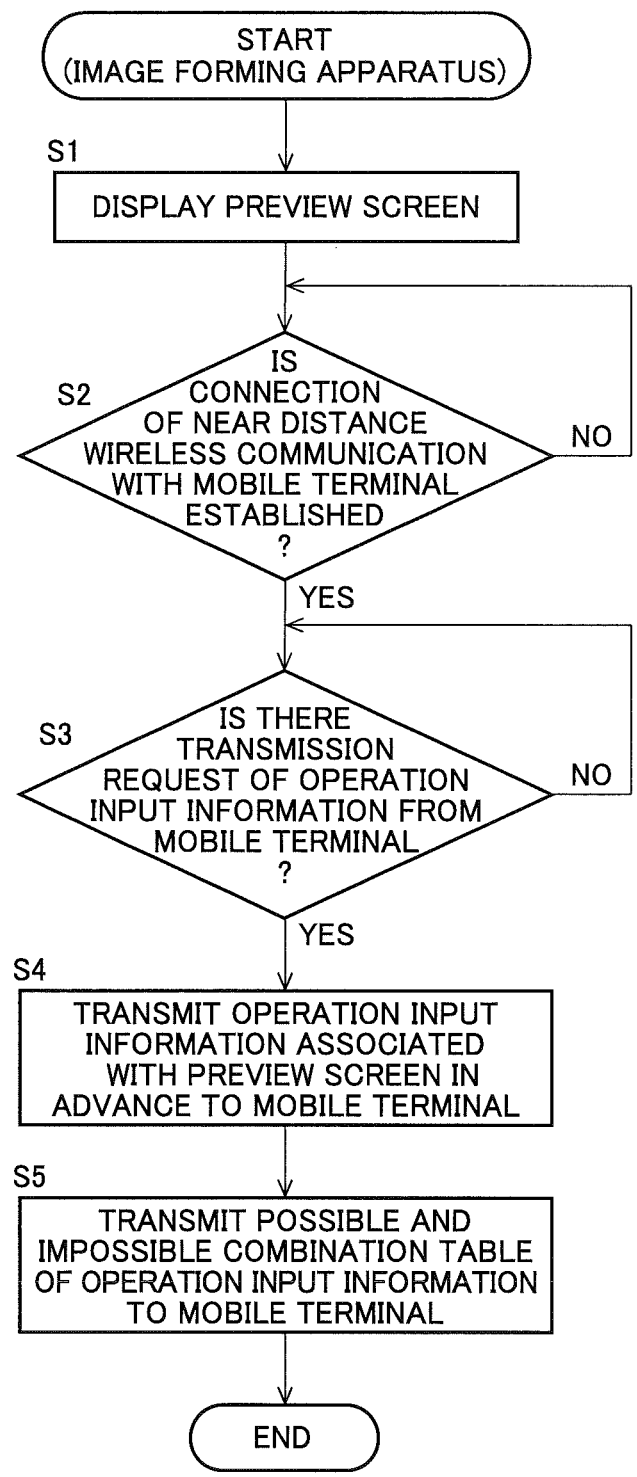

FIG. 3A and FIG. 3B are flowcharts explaining exemplary processing of the image forming apparatus 1a shown in FIG. 2. FIG. 4 is a flowchart explaining exemplary processing of the mobile terminal 2 shown in FIG. 2. In FIG. 3A, first, the image forming apparatus 1a displays a preview screen 141a shown in FIG. 5A on the operation display portion 14a according to predetermined operation input by the user (step S1). In an example of FIG. 5A, "Page 1", "Page 2", "Page 3", . . . are displayed as print preview images. Then, when the mobile terminal 2 comes close to the image forming apparatus 1a in a state where the preview screen 141a is displayed, the image forming apparatus 1a judges whether or not connection of near distance wireless communication with the mobile terminal 2 is established (step S2).

Next, when judging that connection of near distance wireless communication with the mobile terminal 2 is established at step S2 above (in the case of YES), the image forming apparatus 1a judges whether or not there is a transmission request of operation input information from the mobile terminal 2 (step S3). On the other hand, when it is judged that connection of near distance wireless communication with the mobile terminal 2 is not established at step S2 above (in the case of NO), the procedure shifts to a standby state at step S2. When judging that there is a transmission request of the operation input information from the mobile terminal 2 at step S3 above (in the case of YES), the image forming apparatus 1a then transmits the operation input information associated with the preview screen 141a in advance to the mobile terminal 2 (step S4), and further transmits a possible and impossible combination table of the operation input information shown in FIG. 6 to the mobile terminal 2 (step S5). In this example, ID information of the edit items which are set in advance by the user, here, double-side setting, header setting and footer setting concerning editing of a print preview image is transmitted as the operation input information. On the other hand, when it is judged that there is no transmission request of the operation input information from the mobile terminal 2 at step S3 above (in the case of NO), the procedure shifts to a standby state at step S3.

In the mobile terminal 2, operation input screen information associated with the ID Information of double-side setting, header setting and footer setting, which is transmitted from the image forming apparatus 1*a*, is stored, and an operation input screen is displayed on the operation display portion 25 in accordance with this operation input screen information. A screen of various edit menus which is one example of this operation input screen is shown in FIG. 5B. That is, edit items composed of double-side setting, header setting and footer setting are displayed so as to be selectable by the user on the screen of various edit menus 251 of FIG. 5B.

Here, the possible and impossible combination table of FIG. 6 will be explained. This possible and impossible combination table is for judging whether or not combination is allowed among a plurality of edit items displayed on the screen of various edit menus 251 of FIG. 5B. An example of FIG. 6 is a table configuration when the edit items included in a screen of various edit menus 102 shown in FIG. 13A through FIG. 13E above are targeted, in which items which are allowed to be combined are set as "1" and items which are not allowed to be combined are set as "0" for each edit item of page aggregation, book printing, blank sheet skip, background pattern setting, . . . . For example, in the case of page aggregation, book printing is not allowed to be combined, and blank sheet skip and background pattern setting are allowed to be combined. That is, when it is assumed that page aggregation, book printing, blank sheet skip and background pattern setting are displayed on the screen of various edit menus 251 of FIG. 5B, if the user selects page aggregation, combination with book printing is not allowed to be selected, and combination with blank sheet skip and background pattern setting are allowed to be selected.

Then, in a processing flow of FIG. 3B, the image forming apparatus 1*a* judges whether or not separation of the mobile terminal 2 is detected (step S6), and when separation of the mobile terminal 2 is detected, that is, it is judged that the mobile terminal 2 is outside a range of near distance wireless communication (in the case of YES), near distance wireless communication is interrupted once, so that while the preview screen 141*a* is being displayed, whether or not the mobile terminal 2 is held over the preview screen 141*a* again and connection of near distance wireless communication with the mobile terminal 2 is established is judged (step S7). On the other hand, at step S6, when separation of the mobile terminal 2 is not detected, that is, it is judged that the mobile terminal 2 is within the range of near distance wireless communication (in the case of NO), the procedure shifts to step S8 while the preview screen 141*a* is being displayed. When judging that connection of near distance wireless communication with the mobile terminal 2 is established at step S7 above (in the case of YES), the image forming apparatus 1*a* then judges whether or not there is a reflecting request of operation content from the mobile terminal 2 (step S8). On the other hand, when it is judged that connection of near distance wireless communication with the mobile terminal 2 is not established at step S7 above (in the case of No), the procedure shifts to a standby state at step S7.

When judging that there is a reflecting request of operation content from the mobile terminal 2 at step S8 above (in the case of YES), the image forming apparatus 1*a* then receives operation content selected and set by the mobile terminal 2 from the mobile terminal 2 (step S9). In the example of FIG. 5B, footer setting is selected and set by the user, and "footer/date" is received as the operation content. On the other hand, when it is judged that there is no reflecting request of operation content from the mobile terminal 2 at step S8 above (in the case of NO), the procedure shifts to a standby state at step S8.

Figure 5A:
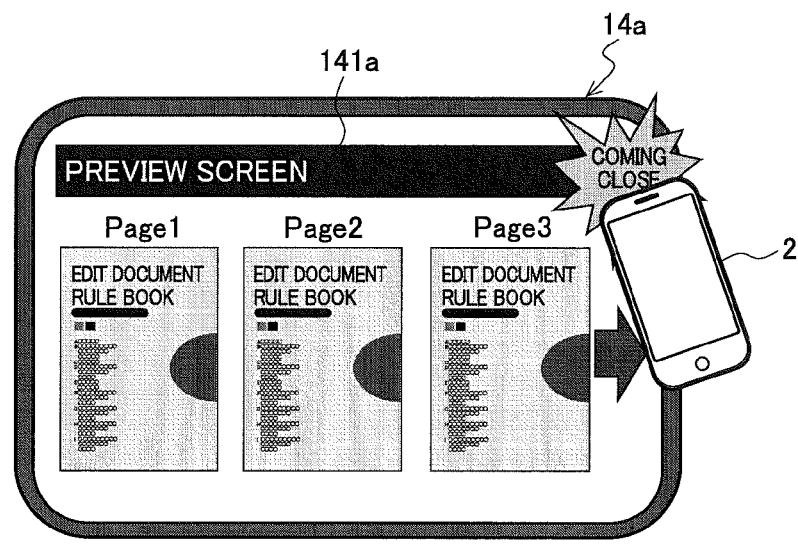
FIG. 5A through FIG. 5C are diagrams showing one example of screen transition.
Figure 5B:
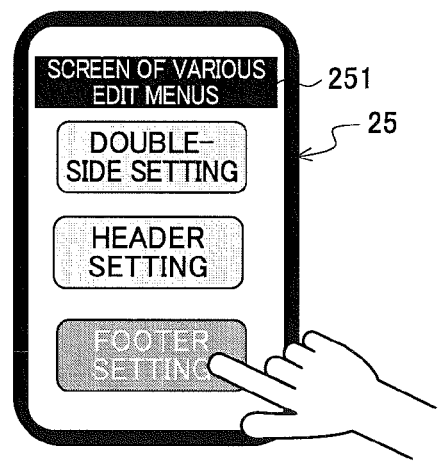
Figures 5C, 6:
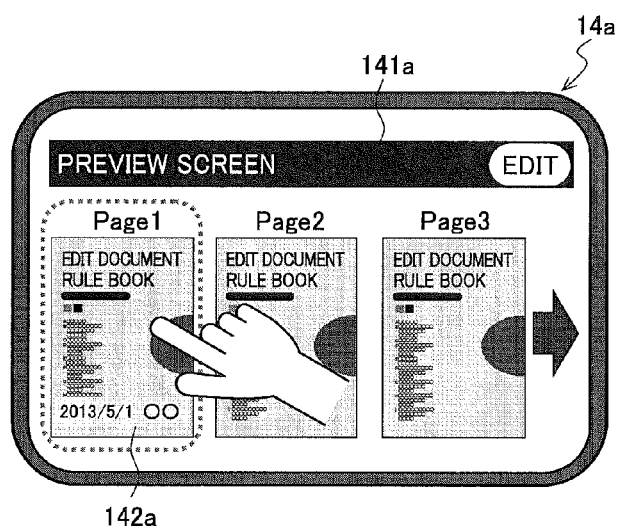
FIG. 6 is a diagram showing one example of a possible and impossible combination table.

The image forming apparatus 1*a* then updates the preview screen 141*a* of the operation display portion 14*a* shown in FIG. 5A based on the operation content received at step S9, that is, "footer/date" designated on the screen of various edit menus 251 of FIG. 5B (step S10). Specifically, the user selects one to be edited by a touch operation from among the print preview images "Page 1", "Page 2", "Page 3", . . . displayed on the preview screen 141*a*. For example, as shown in FIG. 5C, when "Page 1" is selected by the user, a date is automatically inserted in a footer 142*a* of this "Page 1". Note that, if there is a page which is desired to be edited other than "Page 1", when the user touches the corresponding page on the preview screen 141*a*, the same content is reflected immediately.

Then, the image forming apparatus 1*a* judges whether or not other operation content is received from the mobile terminal 2 (step S11), and if judging that other operation content is received (in the case of YES), repeats processing after returning to step S10, and if not (in the case of NO), the procedure ends as it is. In this manner, when there are a plurality of operation content selected and set by the mobile terminal 2, each time operation content is received from the mobile terminal 2, the preview screen 141*a* is updated.

Next, a processing flow of the mobile terminal 2 will be explained based on FIG. 4. First, as shown in FIG. 5A, in a state where the preview screen 141*a* is displayed on the operation display portion 14*a* of the image forming apparatus 1*a*, the mobile terminal 2 is held over the preview screen 141*a*. At this time, the mobile terminal 2 judges whether or not connection of near distance wireless communication with the image forming apparatus 1*a* is established (step S21).

When judging that connection of near distance wireless communication with the image forming apparatus 1*a* is established at step S21 above (in the case of YES), the mobile terminal 2 requests the image forming apparatus 1*a* to transmit operation input information (step S22). The mobile terminal 2 then receives the operation input information associated with the preview screen 141*a* in advance from the image forming apparatus 1*a* (step S23), and further receives a possible and impossible combination table of the operation input information shown in FIG. 6 from the image forming apparatus 1*a* (step S24). In this example, in the same manner as the processing flow of FIG. 3A and FIG. 3B, ID information of the edit items which are set in advance by the user, here, double-side setting, header setting and footer setting concerning editing of a print preview image is received as the operation input information. On the other hand, when it is judged that connection of near distance wireless communication with the image forming apparatus 1*a* is not established at step S21 above (in the case of NO), the procedure shifts to a standby state at step S21.

When receiving the ID information of double-side setting, header setting and footer setting from the image forming apparatus 1*a*, the mobile terminal 2 displays an operation input screen on the operation display portion 25 in accordance with operation input screen information stored in the storage portion 22 (step S25). The screen of various edit menus 251 which is one example of this operation input screen is as shown in FIG. 5B. That is, operation input items (edit items) composed of double-side setting, header setting and footer setting are displayed so as to be selectable by the user on the screen of various edit menus 251 of FIG. 5B.

The mobile terminal 2 judges whether or not the operation input item is selected by the user from the screen of various edit menus 251 displayed on the operation display portion 25 (step S26), and when judging that the operation input item is selected (in the case of YES), judges whether or not there is an item which is not able to be combined with the selected operation input item by referring to the possible and impossible combination table of FIG. 6 (step S27). On the other hand, when it is judged that the operation input item is not selected at step S26 (in the case of NO), the procedure shifts to a standby state at step S26.

When judging that there is an item which is not able to be combined with the operation input item selected above at step S27 (in the case of YES), the mobile terminal 2 turns the item which is not able to be combined into a selection disabled state, for example, such as gray out display or non-display on the screen of various edit menus 251 (step S28). On the other hand, when it is judged that there is no item which is not able to be combined with the selected operation input item at step S27 (in the case of NO), the procedure shifts to step S29.

The mobile terminal 2 judges whether or not there is selection of other operation input item by the user (step S29), and when judging that there is selection of other operation input item (in the case of YES), repeats processing after returning to step S27. On the other hand, when it is judged that there is no selection of other operation input item at step S29 (in the case of NO), the image forming apparatus 1a is requested to reflect the operation content selected and set in the screen of various edit menus 251 of FIG. 5B and the operation content is transmitted to the image forming apparatus 1a (step S30). Note that, after the mobile terminal 2 receives the operation input information and the possible and impossible combination table from the image forming apparatus 1a at step S23 and step S24, the mobile terminal 2 may be separated from the image forming apparatus 1a. That is, the screen of various edit menus 251 of the mobile terminal 2 may be operated in a state where the user separates the mobile terminal 2 from the image forming apparatus 1a. In this case, when the mobile terminal 2 is caused to come close to the preview screen 141a of the image forming apparatus 1a again, the mobile terminal 2 and the image forming apparatus 1a are connected through near distance wireless communication. The image forming apparatus 1a is then requested to reflect the operation content from the mobile terminal 2 and the above-described operation content is transmitted to the image forming apparatus 1a.

In this manner, according to the present embodiment, the image forming apparatus is linked with the mobile terminal and screen transition of the image forming apparatus is eliminated, so that various operation input is able to be performed while confirming operation content from the mobile terminal on a screen of the image forming apparatus.

Second Embodiment

Though near distance wireless communication such as NFC is used for wireless communication of the image forming apparatus 1a and the mobile terminal 2 in the first embodiment described above, other wireless communication capable of longer-distance wireless communication than this near distance wireless communication may be used. For example, WiFi which is a kind of wireless LAN, Bluetooth (registered trademark, same applies below) suitable for wireless communication of about several meters, and the like are applicable. In the exemplary configuration of FIG. 2, the image forming apparatus 1a and the mobile terminal 2 are respectively provided with the wireless LAN-I/F 18a and the wireless LAN-I/F 23 and capable of wireless communication by wireless LAN (WiFi).

Figure 7:
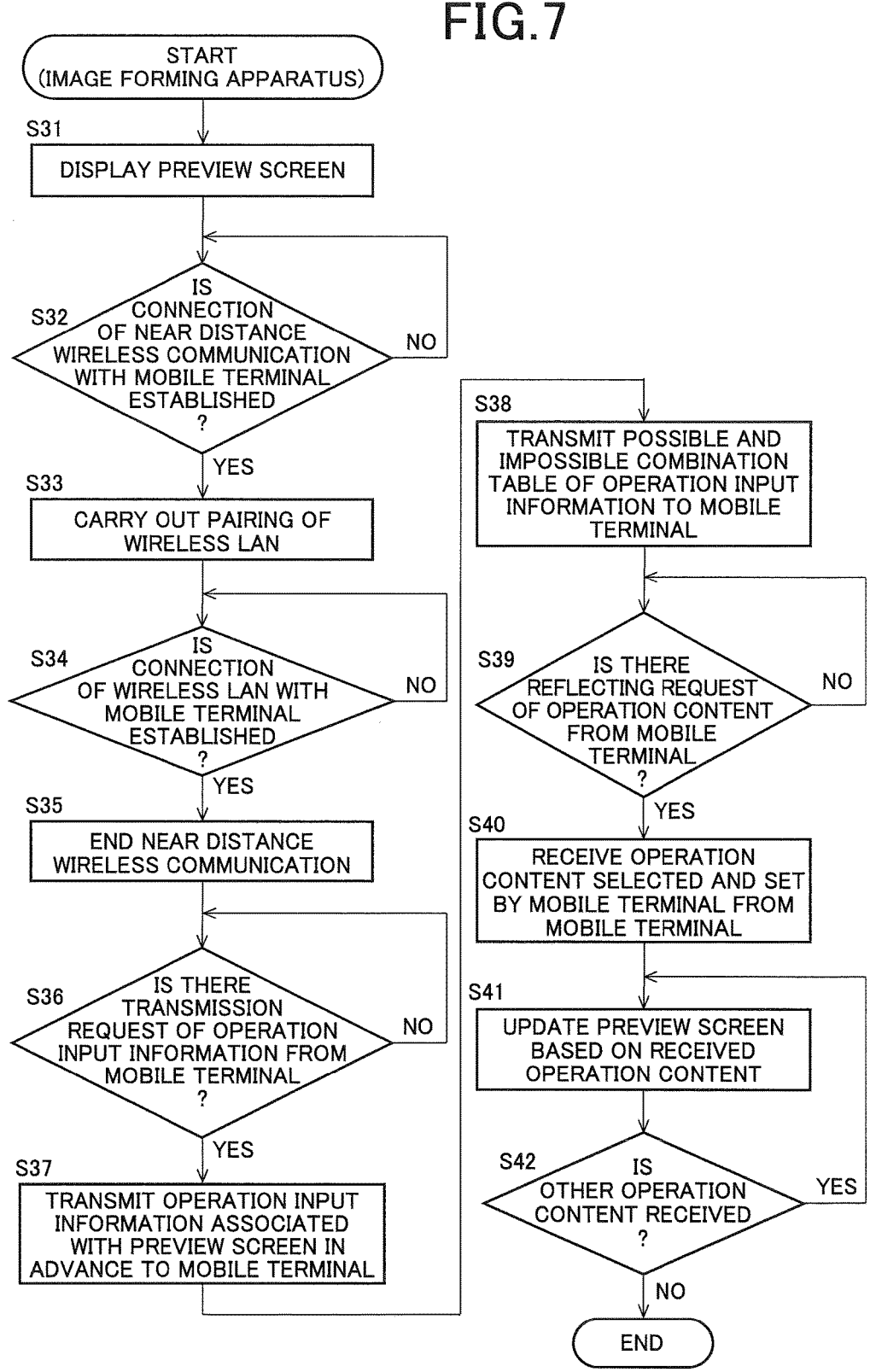
FIG. 7 is a flowchart explaining exemplary processing of an image forming apparatus according to a second embodiment of the present invention.
Figure 8:
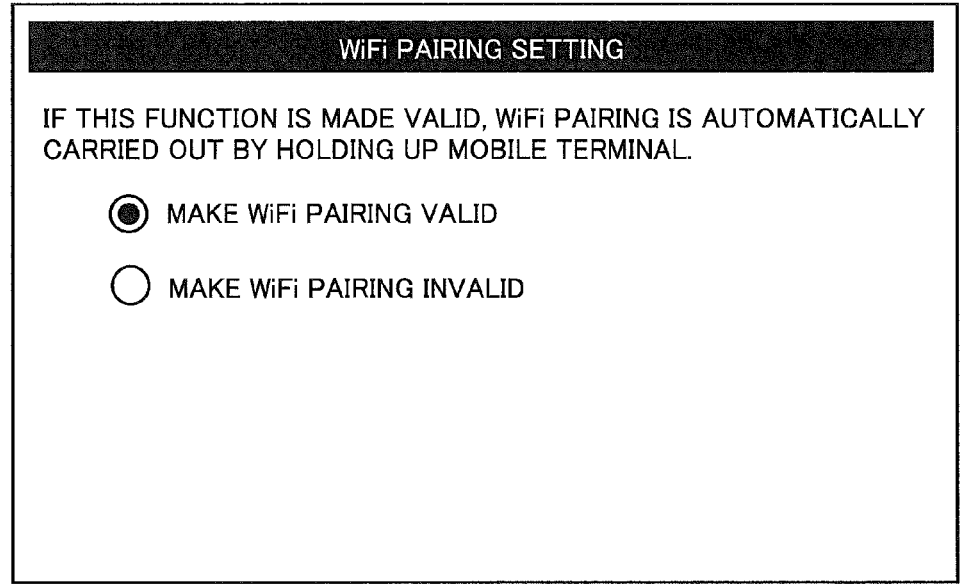
FIG. 8 is a diagram showing one example of a WiFi pairing setting screen displayed on the image forming apparatus.

FIG. 7 is a flowchart explaining exemplary processing of the image forming apparatus 1a according to a second embodiment of the present invention. FIG. 8 is a diagram showing one example of a WiFi pairing setting screen displayed on the image forming apparatus 1a. First, the user displays the WiFi pairing setting screen of FIG. 8 on the operation display portion 14a of the image forming apparatus 1a in advance, and sets whether to make WiFi pairing valid or invalid when connection of near distance wireless communication between the image forming apparatus 1a and the mobile terminal 2 is established. In this example, WiFi pairing is set to be valid.

In FIG. 7, the image forming apparatus 1a displays the preview screen 141a shown in FIG. 5A on the operation display portion 14a according to predetermined operation input by the user (step S31). In the example of FIG. 5A, "Page 1", "Page 2", "Page 3", . . . are displayed as print preview images. Then, when the mobile terminal 2 is caused to come close to the preview screen 141a in a state where the preview screen 141a is displayed, the image forming apparatus 1a judges whether or not connection of near distance wireless communication with the mobile terminal 2 is established (step S32).

When judging that connection of near distance wireless communication with the mobile terminal 2 is established at step S32 above (in the case of YES), the image forming apparatus 1a refers to the WiFi pairing setting of FIG. 8, and because it is set to be "valid" here, executes wireless LAN pairing (step S33). On the other hand, when it is judged that connection of near distance wireless communication with the mobile terminal 2 is not established at step S32 above (in the case of NO), the procedure shifts to a standby state at step S32.

The image forming apparatus 1a judges whether or not connection of wireless LAN with the mobile terminal 2 is established (step S34). When it is judged that connection of wireless LAN with the mobile terminal 2 is established (in the case of YES), the near distance wireless communication with the mobile terminal 2 is finished (step S35). On the other hand, when it is judged that connection of wireless LAN with the mobile terminal 2 is not established at step S34 (in the case of NO), the procedure shifts to a standby state at step S34.

The image forming apparatus 1a judges whether or not there is a transmission request of operation input information from the mobile terminal 2 through wireless LAN (step S36), and when judging that there is a transmission request of operation input information from the mobile terminal 2 (in the case of YES), transmits the operation input information associated with the preview screen 141a in advance to the mobile terminal 2 (step S37), and further transmits the possible and impossible combination table of the operation input information shown in FIG. 6 to the mobile terminal 2 (step S38). In this example, ID information of the edit items which are set in advance by the user, here, double-side setting, header setting and footer setting concerning editing of a print preview image is transmitted as the operation input information. On the other hand, when it is judged that there is no transmission request of the operation input information from the mobile terminal 2 at step S36 above (in the case of NO), the procedure shifts to a standby state at step S36.

Though the same content explained in the first embodiment described above is applied for the mobile terminal 2, when ID information of double-side setting, header setting and footer setting and the possible and impossible combination table (FIG. 6) are received from the image forming apparatus 1a through wireless LAN, an operation input screen is displayed on the operation display portion 25 in accordance with operation input screen information stored in the storage portion 22. The screen of various edit menus 251 which is one example of this operation input screen is as shown in FIG. 5B. That is, edit items composed of double-side setting, header setting and footer setting are displayed so as to be selectable by the user on the screen of various edit menus 251 of FIG. 5B. Further, since it is also the same as to the possible and impossible combination table of FIG. 6, the description is omitted here.

The image forming apparatus 1a judges whether or not there is a reflecting request of operation content from the mobile terminal 2 through wireless LAN (step S39), and when judging that there is a reflecting request of operation content from the mobile terminal 2 (in the case of YES), receives the operation content selected and set by the mobile terminal 2 from the mobile terminal 2 (step S40). In the example of FIG. 5B, footer setting is selected and set by the user, and "footer/date" is received as the operation content. The image forming apparatus 1a then updates the preview screen 141a of the operation display portion 14a shown in FIG. 5A as shown in FIG. 5C based on the operation content received at step S40, that is, "footer/date" designated on the screen of various edit menus 251 of FIG. 5B (step S41). On the other hand, when it is judged that there is no reflecting request of operation content from the mobile terminal 2 at step S39 above (in the case of NO), the procedure shifts to a standby state at step S39.

Then, the image forming apparatus 1a judges whether or not other operation content is received from the mobile terminal 2 (step S42), and if judging that other operation content is received (in the case of YES), repeats processing after returning to step S41, and if not (in the case of NO), the procedure ends as it is. In this manner, when there are a plurality of operation content selected and set by the mobile terminal 2, each time operation content is received from the mobile terminal 2, the preview screen 141a is updated.

In this manner, according to the present embodiment, in addition to the effect by the first embodiment, since the image forming apparatus and the mobile terminal are connected through wireless LAN, it is not necessary to hold over the mobile terminal for each operation input and it is possible to perform operation input even from a place relatively away from the image forming apparatus.

Third Embodiment

Though description has been given by exemplifying the image forming apparatus as the electronic device 1 of FIG. 1 in the first and second embodiments described above, the embodiment of the electronic device 1 is not limited to the image forming apparatus and may be an electronic blackboard which allows performing handwriting input by a finger of the user or a stylus.

Figure 9:
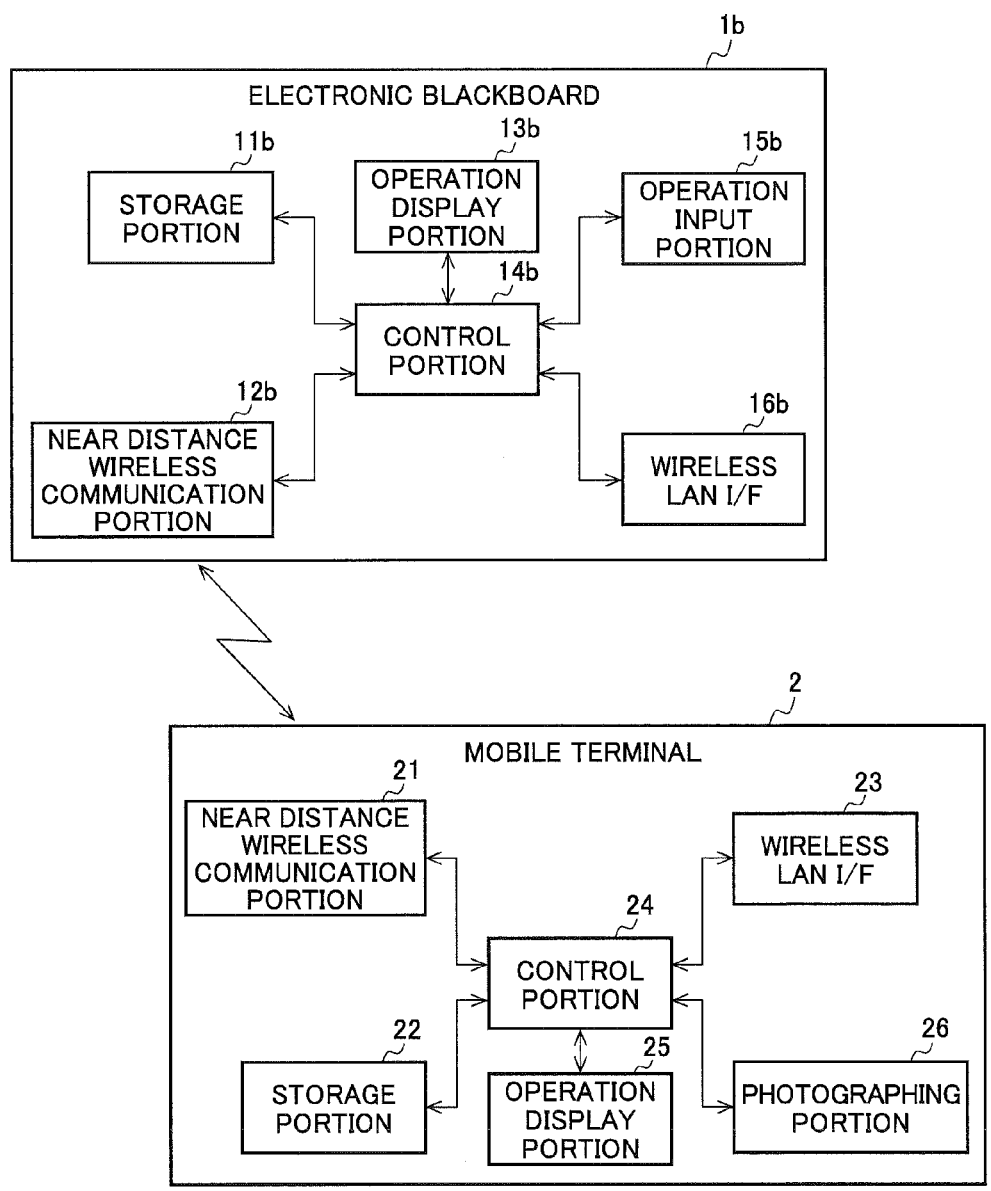
FIG. 9 is a block diagram showing an exemplary configuration of an operation input system according to a third embodiment of the present invention.

FIG. 9 is a block diagram showing an exemplary configuration of an operation input system according to a third embodiment of the present invention. The system of this example is composed of an electronic blackboard 1b which is one example of the electronic device 1 and a mobile terminal 2 capable of near distance wireless communication with the electronic blackboard 1b.

The electronic blackboard 1b is provided with a storage portion 11b such as such as a hard disk or a semiconductor memory, a near distance wireless communication portion 12b which performs near distance wireless communication such as NFC with the mobile terminal 2, an operation display portion 13b which has a touch panel, a control portion 14b composed of a CPU controlling operations of the electronic blackboard 1b, a memory and the like, an operation input portion 15b which includes a numeric key pad and various operation keys, and a wireless LAN-I/F (interface) 16b which performs wireless LAN communication such as WiFi with the mobile terminal 2.

The mobile terminal 2 is provided with a near distance wireless communication portion 21, a storage portion 22, a wireless LAN-I/F 23, a control portion 24, an operation display portion 25, and a photographing portion 26 in the same manner as the exemplary configuration of FIG. 2.

In the present embodiment, the electronic blackboard is linked with the mobile terminal and screen transition of the electronic blackboard is eliminated so that a user is able to perform various operation input while confirming operation content from the mobile terminal on a screen of the electronic blackboard. For such a configuration, the electronic blackboard 1b is provided with a transmitting portion which, when proximity of the mobile terminal 2 is detected in a state of having a specific screen displayed on the operation display portion 13b (corresponding to a display portion of the electronic device of the present invention), transmits operation input information associated with the specific screen in advance to the mobile terminal 2. This transmitting portion corresponds to a transmitting portion of the electronic device of the present invention and is realized by the control portion 14b and the near distance wireless communication portion 12b of the electronic blackboard 1b. More specifically, when the user holds the mobile terminal 2 over the operation display portion 13b of the electronic blackboard 1b, the near distance wireless communication portion 12b of the electronic blackboard 1b detects proximity of the mobile terminal 2, and the near distance wireless communication portion 12b of the electronic blackboard 1b and the near distance wireless communication portion 21 of the mobile terminal 2 have a communication protocol based on, for example, NFC established therebetween to be connected so as to allow communication with each other.

Moreover, examples of the specific screen displayed on the operation display portion 13b of the electronic blackboard 1b include handwriting input screens shown in FIG. 14A through FIG. 14D above. Further, the operation input information transmitted from the electronic blackboard 1b to the mobile terminal 2 is ID information of an operation input item associated with a handwriting input screen in advance or operation input screen information including the ID information of the operation input item associated with the handwriting input screen in advance. As the operation input item, edit items such as a type, a size and a color of a stylus may be set as they are as shown in FIG. 14A through FIG. 14D, or only the edit item which is frequently used by the user among these edit items may be set selectively. Specifically, for example, only a stylus color is associated with the handwriting input screen in advance. In addition, the ID information of the operation input items is information for discriminating these operation input items and notifying operation content according to the operation input items. The electronic blackboard 1b is controlled so as to execute the operation content notified with this ID information. Moreover, the operation input screen information is information of a size, arrangement and the like for displaying the above-described operation input items on a screen as icons.

The mobile terminal 2 is provided with a receiving portion which, when coming close to the electronic blackboard 1b in a state of having a screen displayed on the operation display portion 13b, receives operation input information associated with the handwriting input screen in advance from the electronic blackboard 1b, a display portion which displays an operation input screen based on the received operation input information, and a transmitting portion which transmits operation content (that is, ID information) instructed by the user from the operation input screen to the electronic blackboard 1b. Note that, this display portion corresponds to a display portion of the mobile terminal of the present invention and is realized by the operation display portion 25 of the mobile terminal 2. Moreover, the receiving portion and the transmitting portion correspond to a receiving portion and a transmitting portion of the mobile terminal of the present invention, and are realized by the control portion 24 and the near distance wireless communication portion 21 of the mobile terminal 2. Here, as a method for displaying the operation input screen on the operation display portion 25 of the mobile terminal 2, in the same manner as the case of the first embodiment, two different methods are considered according to content of the operation input information transmitted from the electronic blackboard 1b, but repetitive description is omitted here.

Furthermore, the electronic blackboard 1b is provided with a receiving portion which receives the operation content (ID information) instructed by the user from the mobile terminal 2 and an updating portion which updates the handwriting input screen in accordance with the received operation content. Note that, this receiving portion corresponds to a receiving portion of the electronic device of the present invention and is realized by the control portion 14b and the near distance wireless communication portion 12b of the electronic blackboard 1b. Moreover, the updating portion corresponds to an updating portion of the electronic device of the present invention and is realized as one function of the control portion 14b of the electronic blackboard 1b. Note that, also in the present embodiment, wireless communication such as wireless LAN (WiFi) or Bluetooth may be used instead of near distance wireless communication. Though a basic processing flow of an operation input method when the electronic blackboard 1b is applied is the same as the case of the image forming apparatus 1a, description will be given for some specific examples based on FIG. 10A through FIG. 10C to FIG. 12A through FIG. 12D.

Figure 10A:
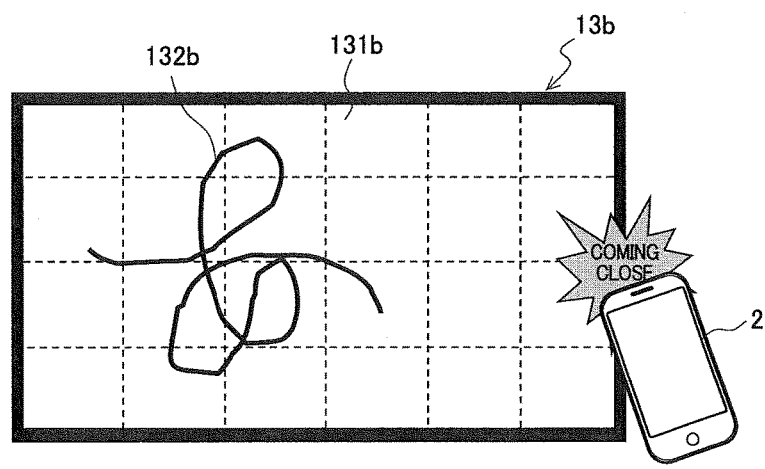
FIG. 10A through FIG. 10C are diagrams explaining exemplary processing of the operation input system according to the third embodiment of the present invention.
Figure 10B:
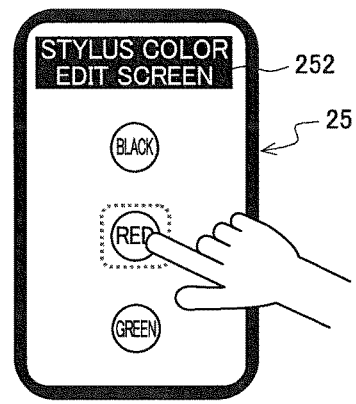
Figure 10C:
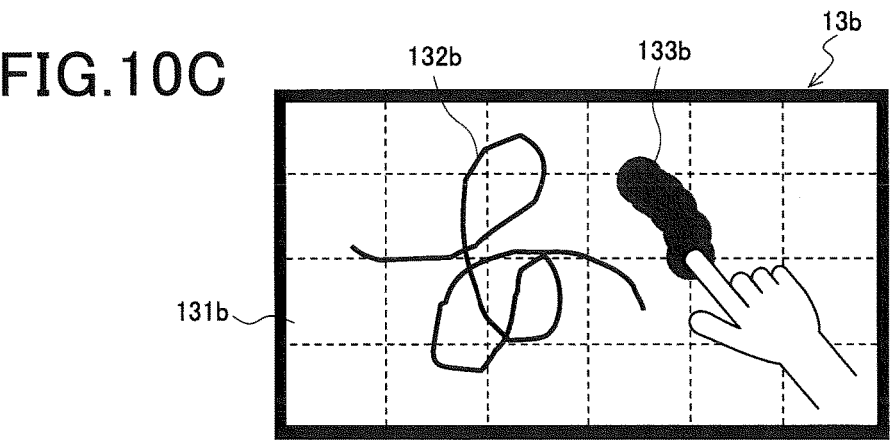

FIG. 10A through FIG. 10C are diagrams explaining exemplary processing of the operation input system according to the third embodiment of the present invention. First, the electronic blackboard 1b displays a handwriting input screen 131b as shown in FIG. 10A, that is, the handwriting input screen 131b including a handwriting input image 132b on the operation display portion 13b according to predetermined operation input by the user. When detecting proximity of the mobile terminal 2 in a state where the handwriting input image 132b is displayed on the handwriting input screen 131b, the electronic blackboard 1b then transmits operation input information associated with the handwriting input screen 131b in advance to the mobile terminal 2. In this example, ID information of the edit item which is set in advance by the user, here, a stylus color concerning editing of a handwriting input image is transmitted as the operation input information.

In the mobile terminal 2, operation input screen information associated with the ID Information of the stylus color, which is transmitted from the electronic blackboard 1b, is stored, and the operation input screen is displayed on the operation display portion 25 in accordance with this operation input screen information. A stylus color edit screen which is one example of this operation input screen is shown in FIG. 10B. That is, black, red and green are displayed as the stylus color so as to be selectable by the user on the stylus color edit screen 252 of FIG. 10B. The mobile terminal 2 transmits operation content selected and set by the user for this stylus color edit screen 252 to the electronic blackboard 1b.

The electronic blackboard 1b receives the operation content selected and set by the mobile terminal 2 from the mobile terminal 2. In the example of FIG. 10B, the stylus color "red" is selected and set by the user, and "stylus color/red" is received as this operation content. The electronic blackboard 1b then updates the handwriting input screen 131b of the operation display portion 13b shown in FIG. 10A based on the operation content received from the mobile terminal 2, that is, "stylus color/red" designated on the stylus color edit screen 252 of FIG. 10B. Specifically, for example, as shown in FIG. 10C, a stylus color of the handwriting input image 133b which is input by handwriting to the handwriting input screen 131b is changed to "red". Note that, a stylus color of the handwriting input image 132b which has been already displayed may be also changed with the same content.

Figure 11A:
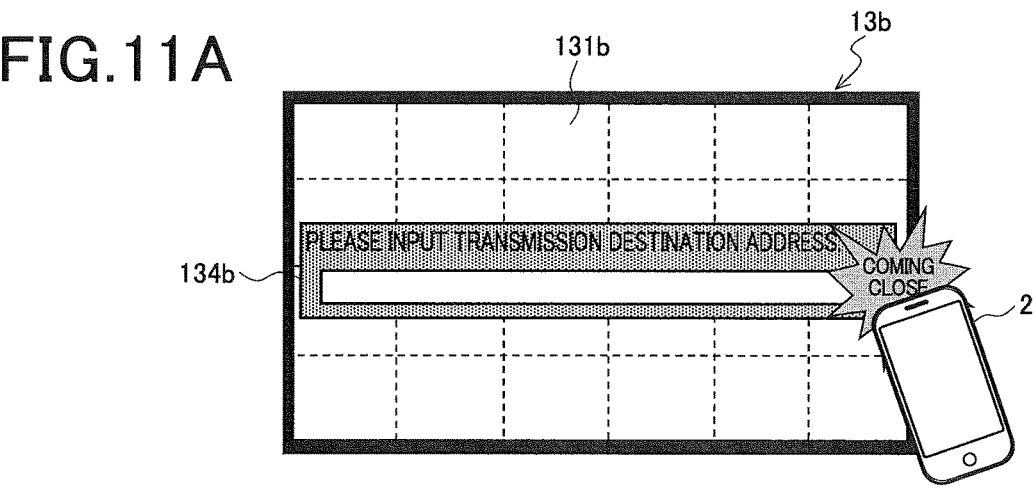
FIG. 11A through FIG. 11C are diagrams explaining another exemplary processing of the operation input system according to the third embodiment of the present invention.
Figure 11B:
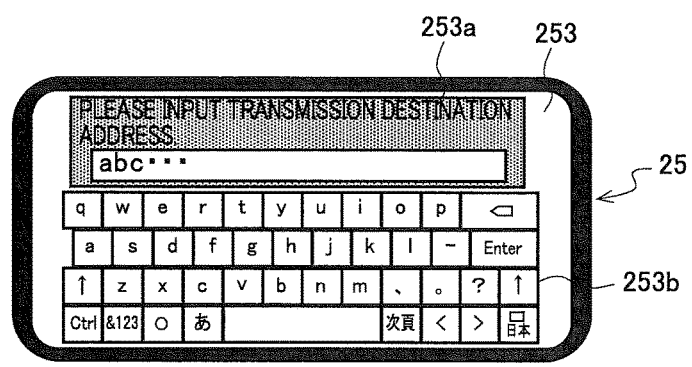
Figure 11C:
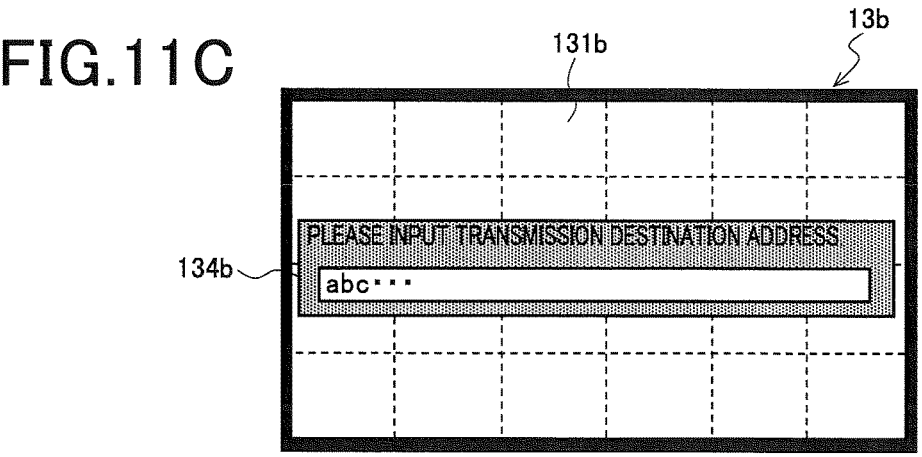

FIG. 11A through FIG. 11C are diagrams explaining another exemplary processing of the operation input system according to the third embodiment of the present invention. First, the electronic blackboard 1b displays the handwriting input screen 131b as shown in FIG. 11A, that is, the handwriting input screen 131b including a transmission destination address input field 134b on the operation display portion 13b according to predetermined operation input by the user. Note that, handwriting input is made invalid in a state where the transmission destination address input field 134b is displayed. When detecting proximity of the mobile terminal 2 in a state where the transmission destination address input field 134b is displayed on the handwriting input screen 131b, the electronic blackboard 1b then transmits operation input information associated with the handwriting input screen 131b in advance to the mobile terminal 2. In this example, ID information corresponding to the transmission destination address input field 134b is transmitted as the operation input information.

In the mobile terminal 2, operation input screen information associated with the ID Information of the transmission destination address input field, which is transmitted from the electronic blackboard 1b, is stored, and the operation input screen is displayed on the operation display portion 25 in accordance with this operation input screen information. A transmission destination address input screen which is one example of this operation input screen is shown in FIG. 11B. That is, the transmission destination address input screen 253 of FIG. 11B includes a transmission destination address input field 253a and a virtual keyboard 253b. Note that, the virtual keyboard 253b is originally mounted on the mobile terminal 2 and is displayed in cooperation with display of the transmission destination address input field 253a. The user inputs desired address information (here, abc . . . ) by a touch operation for this virtual keyboard 253b. The content of this operation input is reflected and displayed in the transmission destination address input field 253a. For example, when a predetermined transmission button (not shown) is pressed by the user, the mobile terminal 2 then transmits operation content input from the transmission destination address input screen 253 to the electronic blackboard 1b.

The electronic blackboard 1b receives the operation content input by the mobile terminal 2 from the mobile terminal 2. In the example of FIG. 11B, "abc . . . " is input by the user as a transmission destination address, and "abc . . . " is received as this operation content. Then, the electronic blackboard 1b updates the handwriting input screen 131b of the operation display portion 13b shown in FIG. 11A based on the operation content received from the mobile terminal 2, that is, "abc . . . " designated on the transmission destination address input screen 253 of FIG. 11B. Specifically, for example, as shown in FIG. 11C, the operation content "abc . . . " is automatically reflected in the transmission destination address input field 134b of the handwriting input screen 131b.

Figure 12A:
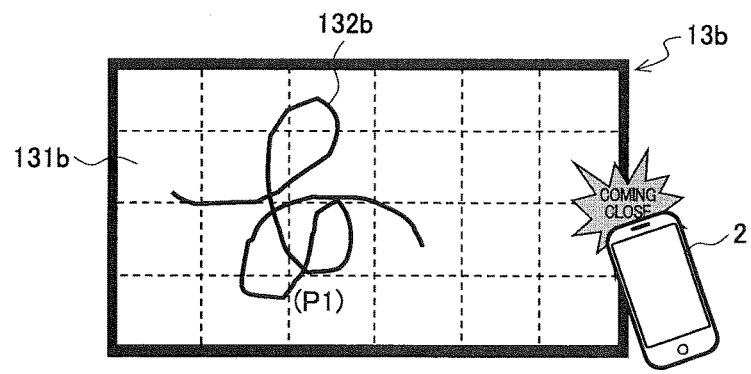
FIG. 12A through FIG. 12D are diagrams explaining still another exemplary processing of the operation input system according to the third embodiment of the present invention.

FIG. 12A through FIG. 12D are diagrams explaining still another exemplary processing of the operation input system according to the third embodiment of the present invention. First, the electronic blackboard 1b displays the handwriting input screen 131b as shown in FIG. 12A, that is, the handwriting input screen 131b including the handwriting input image 132b on the operation display portion 13b according to predetermined operation input by the user. When detecting proximity of the mobile terminal 2 in a state where the handwriting input image 132b is displayed on the handwriting input screen 131b, the electronic blackboard 1b then transmits operation input information associated with the handwriting input screen 131b in advance to the mobile terminal 2. In this example, a page list including the handwriting input image 132b, that is, a page list including handwriting input images P1 to P4 with the handwriting input image 132b as P1 is transmitted as the operation input information.

Figure 12B:
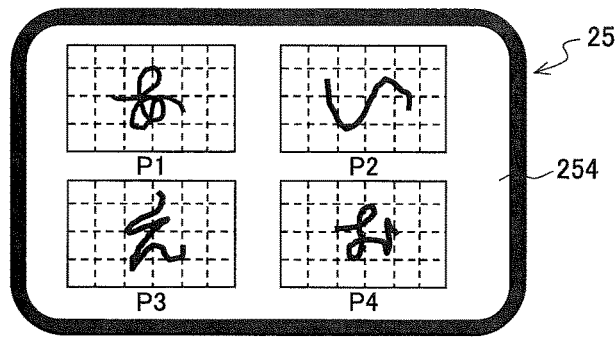
Figure 12C:
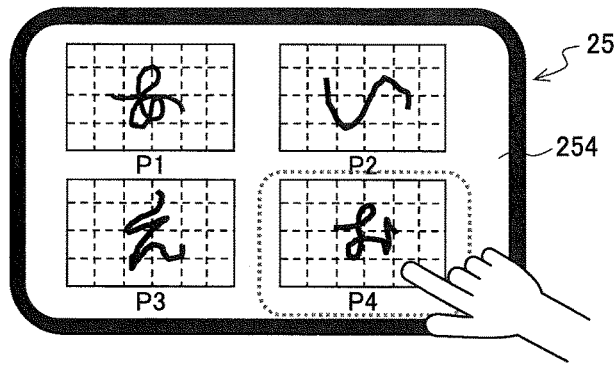

In the mobile terminal 2, operation input screen information associated with the page list transmitted from the electronic blackboard 1b is stored, and the operation input screen is displayed on the operation display portion 25 in accordance with this operation input screen information. A page list screen which is one example of this operation input screen is shown in FIG. 12B. That is, the handwriting input images P1 to P4 are displayed so as to be selectable by the user on the page list screen 254 of FIG. 12B. The mobile terminal 2 transmits operation content selected by the user for this page list screen 254 to the electronic blackboard 1b. Here, "P4" corresponding to the handwriting input image P4 is transmitted as shown in FIG. 12C.

Figure 12D:
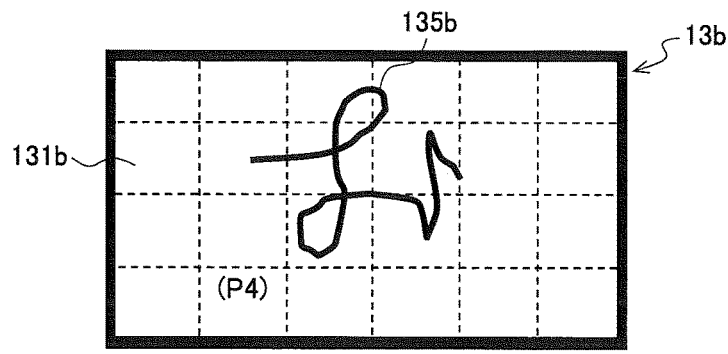
Figure 13A:
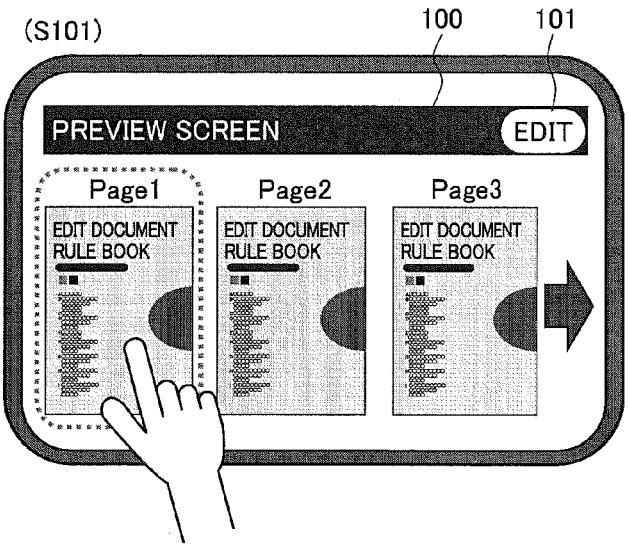
FIG. 13A through FIG. 13E are diagrams explaining a preview display function in a conventional image forming apparatus.
Figure 13B:
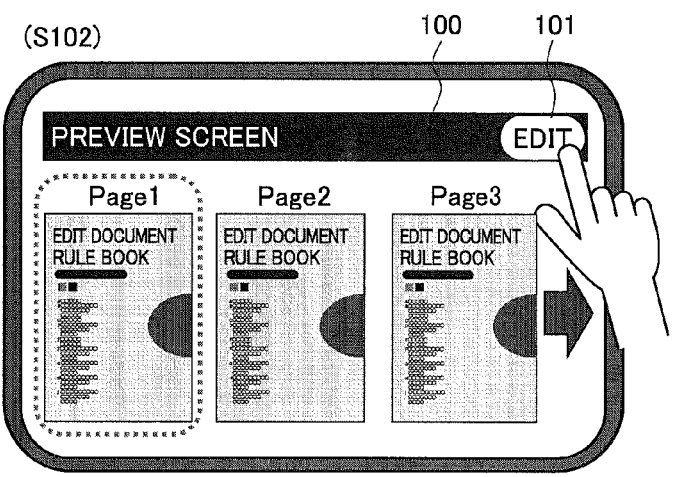
Figure 13C:
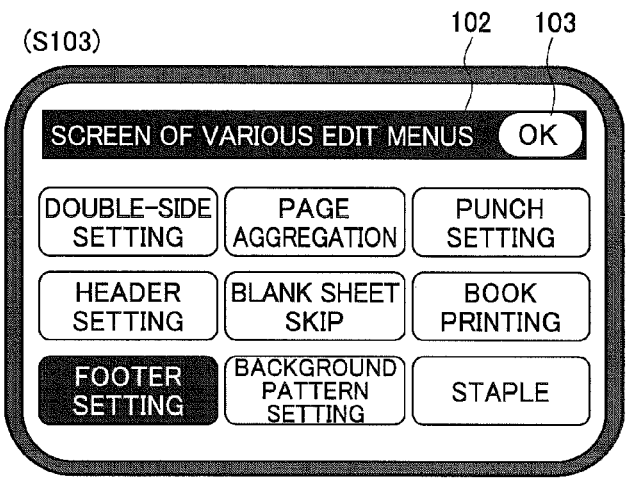
Figure 13D:
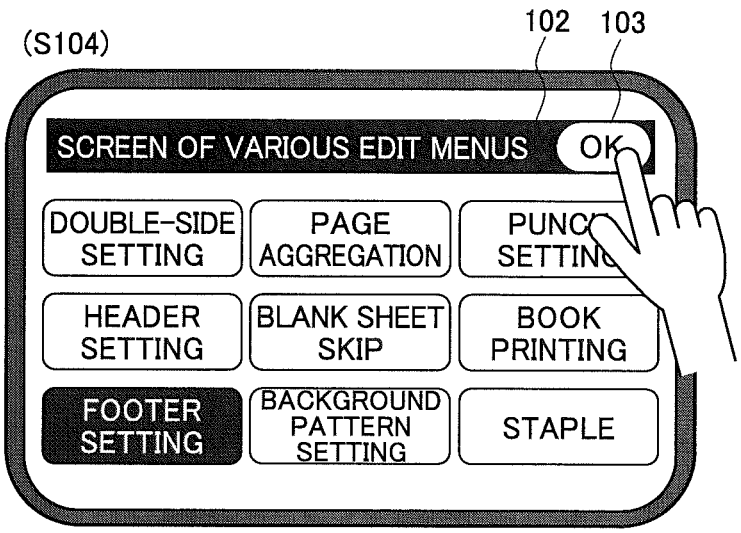
Figure 13E:
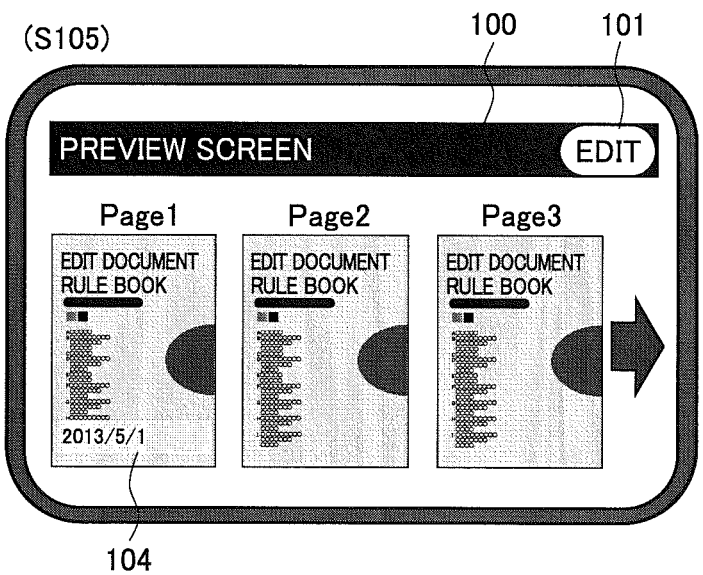
Figure 14A:
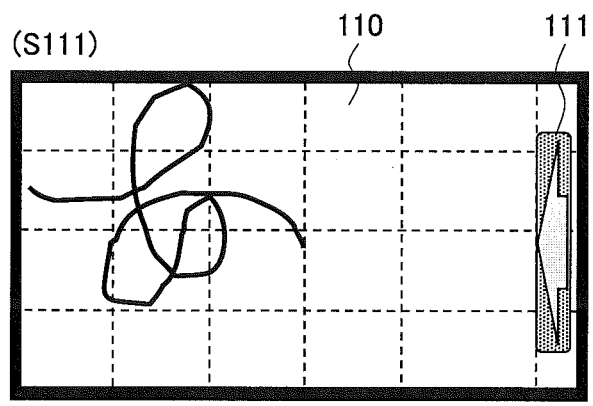
FIG. 14A through FIG. 14D are diagrams explaining a handwriting input function in a conventional electronic blackboard.
Figure 14B:
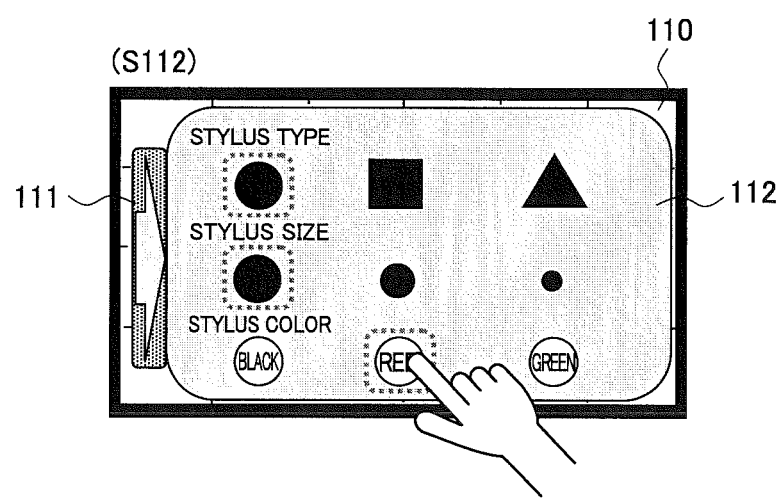
Figure 14C:
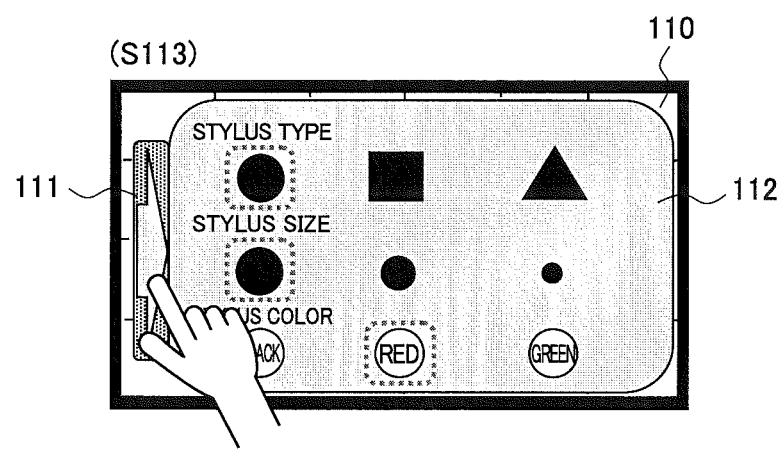
Figure 14D:
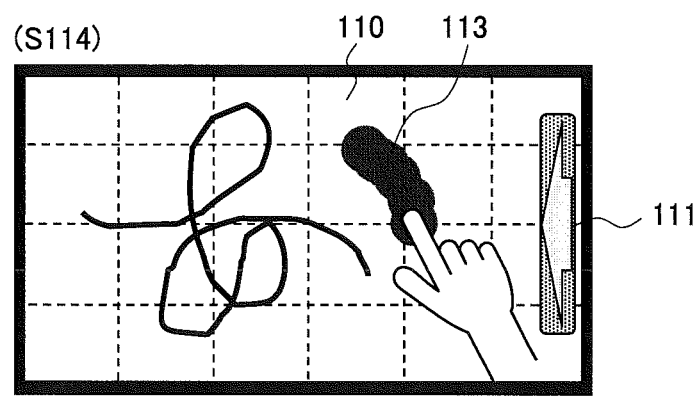

The electronic blackboard 1b receives the operation content selected by the mobile terminal 2 from the mobile terminal 2. In the example of FIG. 12C, the handwriting input image P4 is selected by the user and "P4" is received as this operation content. Then, the electronic blackboard 1b updates the handwriting input screen 131b of the operation display portion 13b shown in FIG. 12A based on the operation content received from the mobile terminal 2, that is, "P4" designated on the page list screen 254 of FIG. 12C. Specifically, for example, as shown in FIG. 12D, the handwriting input image 132b (P1) displayed on the handwriting input screen 131b is switched to the handwriting input image 135b (P4).

In this manner, according to the present embodiment, the electronic blackboard is linked with the mobile terminal and screen transition of the electronic blackboard is eliminated so that various operation input is able to be performed while confirming operation content from the mobile terminal on a screen of the electronic blackboard.

As above, though description has been given by exemplifying the operation input system, the electronic device, the mobile terminal and the operation input method as each embodiment of the present invention, the present invention may have a form as a program for causing a computer to execute this operation input method or a form as a computer readable recording medium having this program recorded therein.

As the above-described recording medium, specifically, a CD-ROM (-R/-RW), a magneto-optical disk, an HD (hard disk), a DVD-ROM (-R/-RW-RAM), an FD (flexible disk), a flash memory, a memory card, a memory stick, other various ROMs and RAMs and the like are able to be assumed, and realizing of this method is facilitated by recoding the program for causing the computer to execute the operation input method of the present invention described above in these recording mediums for distribution. In addition, the operation input method according to the present invention is able to be executed by mounting the recording medium as described above in an information processing apparatus such as a computer to read the program by the information processing apparatus or by storing this program in the recording medium provided in the information processing apparatus to read as necessary.

Further, according to the present invention, the electronic device such as the image forming apparatus is linked with the mobile terminal and screen transition of the electronic device is eliminated so that various operation input is able to be performed while confirming operation content from the mobile terminal on a screen of the electronic device.

The invention claimed is:

1. An operation input system, comprising an electronic device having a display portion and a mobile terminal capable of near distance wireless communication with the electronic device, wherein
    the electronic device is provided with the display portion which, when proximity of the mobile terminal is detected in a state of displaying a specific screen on the display portion, displays the specific screen but not operation input information associated with the specific screen in advance, and a transmitting portion which transmits the operation input information to the mobile terminal,
    the mobile terminal is provided with a display portion which displays an operation input screen based on the operation input information transmitted from the electronic device, and a transmitting portion which transmits operation content instructed by a user from the operation input screen to the electronic device, and
    the electronic device is provided with an updating portion which updates the specific screen in accordance with the operation content transmitted from the mobile terminal.

2. The operation input system according to claim 1, wherein
    when connection of the near distance wireless communication with the mobile terminal is established, the electronic device establishes connection of other wireless communication capable of longer-distance wireless communication than the near distance wireless communication with the mobile terminal.

3. The operation input system according to claim 1, wherein
    as the operation input information, the transmitting portion of the electronic device transmits ID information of an operation input item associated with the specific screen in advance to the mobile terminal, the mobile terminal is provided with a storage portion in which operation input screen information associated with the ID information of the operation input item is stored, and the display portion of the mobile terminal displays the operation input screen in accordance with the operation input screen information stored in the storage portion.

4. The operation input system according to claim 3, wherein the operation input item is set by the user in advance.

5. The operation input system according to claim 3, wherein in a case where the electronic device is an image forming apparatus, the specific screen is a preview screen, and the operation input item is an item concerning editing of a print preview image displayed on the preview screen.

6. The operation input system according to claim 3, wherein in a case where the electronic device is an electronic blackboard, the specific screen is a handwriting input screen, and the operation input item is an item concerning editing of a handwriting input image displayed on the handwriting input screen.

7. The operation input system according to claim 1, wherein as the operation input information, the transmitting portion of the electronic device transmits operation input screen information including ID information of an operation input item associated with the specific screen in advance to the mobile terminal, and the display portion of the mobile terminal displays the operation input screen in accordance with the operation input screen information.

8. An electronic device having a display portion and capable of near distance wireless communication with a mobile terminal, wherein the electronic device is provided with the display portion which, when proximity of the mobile terminal is detected in a state of displaying a specific screen on the display portion, displays the specific screen but not operation input information associated with the specific screen in advance, and a transmitting portion which transmits the operation input information to the mobile terminal, a receiving portion which receives operation content instructed by a user for the operation input information from the mobile terminal, and an updating portion which updates the specific screen in accordance with the operation content received by the receiving portion.

* * * * *